INVENTOR
CHARLES G. FERRARI
BY D.C. Roylance
ATTORNEY

United States Patent Office 2,978,332
Patented Apr. 4, 1961

2,978,332
BREAD IMPROVER COMPOSITIONS AND METHODS FOR PREPARING THE SAME

Charles G. Ferrari, Evanston, Ill., assignor to J. R. Short Milling Company, Chicago, Ill., a corporation of Illinois Filed June 27, 1958, Ser. No. 745,173
6 Claims. (Cl. 99—91)

This invention relates to novel bread improver compositions and methods for preparing the same.

It has long been common practice in the baking industry to employ, as additive in the dough-forming mixtures from which baked goods are prepared, certain materials capable of acting to produce specific improvements observable either in the dough itself or in the baked goods produced therefrom. Such materials have become known as "bread improvers," this term embracing not only individual agents but also compositions containing more than one active agent.

In my copending application, Serial Number 744,897, filed concurrently herewith, I have disclosed certain novel bread improver compositions comprising a particulate bread improver agent, such as calcium peroxide, dicalcium phosphate, etc., particles of which are physically attached to an edible protective material. Such compositions provide two unique advantages, one being a delay in the action of the bread improver agent during preparation of the dough, and the other being an increased shelf life when the bread improver composition includes a second component, such as an enzymatically active legume flour, which is sensitive to the particulate agent first mentioned.

The present invention is directed to such compositions characterized by a novel and advantageous relationship between the particulate bread improver agent and the protective material to which it is attached.

One object of the invention is to provide bread improver compositions wherein a particulate bread improver agent is physically associated with an edible protective material in such fashion that, when the bread improver is employed in a dough mixture, there is accomplished not only a delay in contact between the bread improver agent and the liquid constituents of the mixture but also a progressive release of the bread improver agent, so that its action is distributed over a material portion of the dough mixing operation.

Another object is to provide novel multi-component bread improver compositions having an improved shelf life.

A further object is to devise a method whereby such bread improver compositions can be manufactured in a relatively simple and inexpensive manner.

Figure 1:
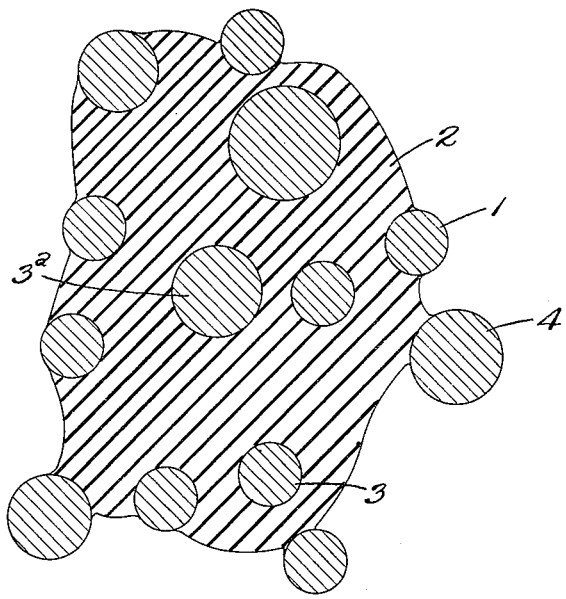

Broadly stated, the bread improver compositions of the invention comprise a normally solid, edible protective material and a finely divided bread improver agent, particles of the latter being physically combined with larger bodies of the protective material in such fashion that, while some of the particles of bread improver agent are fully embedded in the protective material, others have at least a portion of their surfaces exposed, in the manner illustrated diagrammatically in Fig. 1, for example. Thus, some particles of the bread improver agent, as indicated at 1, are only partially embedded in the larger particle of protective material 2, while other particles 3 of the bread improver agent are fully embedded and therefore completely masked by the protective material. As will be explained hereinafter, it is also possible to so prepare my compositions in such manner that some of the fine bread improver particles, as indicated at 4, are merely attached to the larger body of protective material 2. Further, of the fully embedded particles 3, some may be located at a greater distance from the surface of protective body 2, as indicated at 3a.

As the particulate bread improver agents to be combined with a protective material, the invention may employ many types of bread improver materials. Of these, the most important are the inorganic bread improver compounds, including calcium peroxide, the phosphates of calcium and ammonium, particularly monocalcium phosphate, dicalcium phosphate, diammonium phosphate and mixtures thereof, the persulfates of calcium, potassium, sodium and ammonium, potassium bromate, potassium iodate, ammonium sulfate, calcium sulfate, ammonium chloride, sodium chlorite, and calcium carbonate.

As protective materials, the invention may employ any suitable edible, normally solid material capable of being taken up, as by being dissolved or emulsified, by the liquid phase of a dough during dough mixing. Particularly advantageous results are obtained with water-emulsifiable materials selected from the class consisting of monoglycerides having an iodine value not in excess of 50, mixed mono- and diglycerides having an iodine value not in excess of 50, the tartaric acid esters of mono- and diglycerides which have an iodine value not exceeding 50, and normally solid mixtures of such materials with lecithin. Since the protective materials are employed, in accordance with the invention, in direct contact with various agents which tend to promote rancidity in unsaturated fats, it is important that those materials which are so unsaturated as to have an iodine value in excess of 50 be avoided. Thus, while compounds like glyceryl monostearate and glyceryl monopalmitate and compositions such as the mixed monoglycerides obtained from lard, vegetable oils and edible fats, with such mixtures having an iodine value not in excess of 50, are highly advantageous for use in accordance with the invention, the monoglyceride materials derived from soybean or cotton seed oils, for example, are so unsaturated as to have an iodine value in excess of 50 and are accordingly unsuitable. Similarly, monoglyceride materials containing substantial proportions of oleic, linoleic, linolenic or arachadonic acids, are unsuitable. However, the presence of diglycerides in small quantities is not deleterious so long as the diglyceride is stable and is derived from a fatty acid such that the iodine value is not in excess of 50.

As will be apparent from the foregoing discussion of the product diagrammatically illustrated in Fig. 1, it is necessary that the protective material be solid under ordinary conditions. Except that it is salve-like, as ordinarily supplied in commerce, lecithin would be an excellent protective material when used alone. However, because of its usually plastic nature, lecithin is employed in the compositions of the invention in combination with one or more of the monoglyceride materials above identified and, when so employed, is included in proportions such that the total mixture is solid under the conditions to which bread improver compositions are normally subjected.

The compositions of the invention can also include additional materials as diluents or extenders, such materials particularly including corn flour, partially dextrinized corn flour, other cereal flours, starches, sugars and salt. In certain embodiments of the invention, such materials are employed in simple admixture with the protected bread improver agent. In other embodiments, however, such materials are employed as a carrier for the protective material, providing a product of the type generally illustrated in Fig. 2 and later described.

Figure 2:
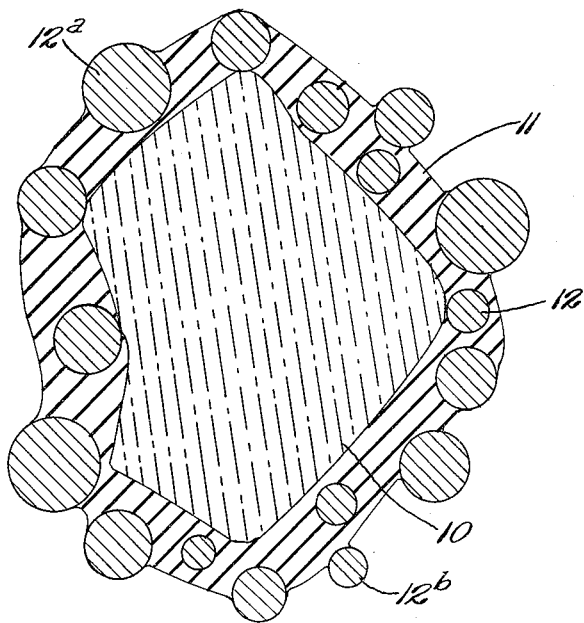

The bread improver materials illustrated generally in Figs. 1 and 2, comprising a finely particulate bread improver agent specially associated with a protective material, are particularly well adapted for inclusion in multi-component bread improver compositions including, as one ingredient, a bread improver material normally sensitive to the protected agent. Thus, the invention is particularly useful in connection with bread improver compositions comprising certain inorganic bread improver compounds, such as calcium peroxide and dicalcium phosphate, as the protected agent, and an enzyme material as the sensitive ingredient of the composition. In such embodiments of the invention, I may employ as the sensitive material any of the enzymatically active legume materials, such as the flours and meals obtained from soybeans, peas, peanuts, beans and lentils, such materials being capable of both bleaching carotinoids and modifying dough properties. Similarly, I may employ as the sensitive ingredient any of the commercial enzyme concentrates, such as the well-known fungal enzyme products. I have found that all of the enzyme materials just referred to tend to be deactivated by prolonged contact with or proximity to many of the inorganic bread improver compounds, particularly calcium peroxide and dicalcium phosphate. Further, when a legume material is employed as a source of enzymatic activity, it is frequently desirable to have that material include all or a substantial portion of its natural fat content. This gives rise to additional sensitivity, since materials like calcium peroxide and dicalcium phosphate tend to promote rancidity in the fatty content of the legume material, and so cause the composition to be unsuitable for use in dough.

Bread improver materials of the general nature illustrated in Fig. 1 can be prepared by two procedures. By one method, the finely divided agent to be protected is mechanically worked together, as in a mulling apparatus, with a more coarsely particulate protective material. Thus, employing a monoglyceride material as the protective agent, the monoglyceride material can be in the form of beads or pearls averaging 30–80 mesh, for example, while the agent to be protected has a much smaller average particle size, say 200 mesh. As the two finely divided materials are worked together, the smaller particles of the agent to be protected are forced into the larger bodies of protective material.

Following such a procedure, I find it advantageous to include in the mixture, during the mulling operation, an additional particulate material, the particles of which are relatively sharp and hard. Such additional material serves to prevent the fine particles of the mixture from escaping the mulling surfaces, and so tends to promote the embedding action. As additional materials for this purpose, I can employ corn flour, salt, sugar or the like.

Rather than employing a mulling procedure, materials of the type illustrated in Fig. 1 can be prepared by first melting the protective material and then adding the particulate bread improver agent progressively, with continual agitation, until the mixture is converted, by reason of its increasing solids content and the effect of agitation, into a friable mass consisting of particles or granules of the type seen in Fig. 1.

The water-emulsifiable materials, and particularly that class of materials hereinbefore defined, have proven to be particularly effective as protective materials for use in the invention. Not only do such materials provide very satisfactory stability of the product, when the same includes an enzymatically active or like sensitive material, but they also afford a very good time delay in the action of the protected bread improver agent during the dough mixing step. Such superior delaying ability appears to result from the fact that, for such protective materials to become emulsified with the aqueous phase of the dough, a vigorous mechanical working, in addition to contact with the liquid, is required. In this connection, it will be understood that the speed of emulsification, during dough mixing, depends upon the amount of protective material employed, its physical nature in the product, and the emulsification characteristics of the specific material used. Thus, compounds like glyceryl monostearate tend to be taken up by the dough liquid more slowly than, for example, the diacetyl tartaric acid of glyceryl monostearate. When employing the more slowly emulsifiable materials, such as glyceryl monostearate, in substantial proportions, it is sometimes advantageous to combine therewith a highly water soluble material in such fashion as to cause the protective material to be taken up more quickly by the aqueous phase of the dough. Thus, in some embodiments of the invention, I combine with the monoglyceride or like protective material a lesser amount, in the range of 5–15% by weight of the monoglyceride, of a sugar syrup such as corn syrup, the two materials being emulsified, so that the syrup is the disperse phase and the monoglyceride or the like the continuous phase.

Depending upon the nature of the specific particulate bread improver agent and protective material employed, as well as the nature of the mixing or mulling apparatus used to work the two materials together, difficulties are sometimes encountered in obtaining such good contact and pressure relationships between the particles that a proper embedding action will result. I accordingly find it helpful to have the protective material present as a coating on the particles of a particulate carrier material, advantageously a partially dextrinized corn flour, or other cereal flour product, having an average particle size of 20–80 mesh. Thus, I may first coat partially dextrinized corn flour with one of the aforementioned monoglyceride materials, and then mull the monoglyceride-coated flour with the more finely particulate bread improver to be protected, obtaining a product of the type seen in Fig. 2. Here, each particle of carrier material 10 carries a relatively thick coating 11 of the protective material, particles 12 of the bread improver agent being fully embedded in such coating, particles 12$^a$ thereof being partially embedded, and particles 12$^b$ merely attached to the coating.

Broadly, the protective material, such as the monoglyceride, can be employed in an amount equal to from ¼ to twice the weight of the bread improver agent to be protected. When employing the smaller proportions of protective material, it is especially helpful to have the protective material distributed on a particulate carrier material.

The following examples are illustrative of the invention:

*Example 1*

The bread improver agent to be associated with the protective material is food grade calcium peroxide (60% $CaO_2$) having an average particle size of about 200 mesh, all being finer than 100 mesh. The protective material is a distilled glyceryl monostearate (Myverol Type 18–05, Distillation Product Industries, Rochester, New York) obtained from triple pressed stearic acid and having a minimum monoester content of 90%, an iodine value of approximately 3 and a congealing point of 66° C. This monoglyceride is in beaded form, with an average particle size of 30–50 mesh.

Equal parts by weight of the calcium peroxide and glyceryl monostearate are placed in a commercial scale mulling apparatus comprising a mixing chamber having a flat bottom wall against which operate a plurality of rollers disposed to rotate about a horizontal axis, the rollers being carried by arms swinging about a vertical axis, so that the rollers travel circular paths over the bottom wall of the mixing chamber. The apparatus also includes travelling plows disposed to direct the work material into the paths of the rollers. Mulling is carried out for 30 minutes, with the mixture maintained at 40–42° C., this operation being effective to force the particles of calcium peroxide into the beads of monoglyceride, so that the product wherein a major proportion of the particles have the configuration illustrated in Fig. 1, the balance consisting of (1) free particles of calcium peroxide and monoglyceride, and (2) agglomerates of the two components of much simpler configuration than shown in Fig. 1, e.g., a single particle of calcium peroxide embedded in or attached to a single bead of monoglyceride.

A bread improver composition is prepared by blending 300 parts by weight of the mulled, monoglyceride-protected calcium peroxide, with 12000 parts by weight of partially dextrinized corn flour, as an extender. Test bakes carried out to produce white bread with such composition, employing the same at the rate of .375% of the total wheat flour in the dough, show the expected "calcium peroxide effect," particularly by requiring an increased amount of water to prepare a dough of proper consistency, as well as by increased volume and softness, and improved grain and texture, of the finished bread.

*Example 2*

The procedure of Example 1 is repeated, except that the ingredients introduced to the mulling apparatus consist of 25 parts by weight of the glyceryl monostearate, 25 parts by weight of partially dextrinized corn flour substantially all of the particles of which are 60–80 mesh, and 50 parts by weight of the calcium peroxide. Addition of the corn flour is found to aid the mulling operation very materially, so that the finished product is made up predominantly of particles having the general configuration illustrated in Fig. 1, some of such particles having corn flour particles attached thereto.

A complete bread improver composition is prepared by blending 250 parts by weight of the mulled product, prepared as above described, with 4000 parts by weight of full fat, enzymatically active soy flour and 5750 parts by weight partially dextrinized corn flour, as an extender. A conventional composition, for use as a control, is prepared by blending 125 parts by weight of uncoated calcium peroxide, of the same strength and particle size above mentioned, with 4000 parts of the full fat enzymatically active soy flour and 5875 parts by weight of partially dextrinized corn flour.

Samples of the control composition and the novel composition of this example are separately stored, some at room temperature and some at 98° F. The samples of the control composition, containing uncoated calcium peroxide, begin to show marked rancidity after only two or three months storage time, particularly at the higher temperature. Also, in the samples of control composition, the lipoxidase content of the soy flour decreases by as much as 60–65% in times as short as two months. The samples of the novel composition of this invention, on the other hand, exhibit no rancidity, and no undue loss in lipoxidase activity, after being stored for 6 months, even at the higher temperature.

In test bakes to produce white bread, using the bread improver composition of this example at the rate of .375% of the total wheat flour in the dough, as much as 3½% additional water is required to produce a dough of proper consistency. This is an increase in water absorption of as much as 1½% more than is attained with unprotected calcium peroxide, such increase resulting from delayed action of the calcium peroxide in the dough, and progressive release of the calcium peroxide by the monoglyceride as dough mixing is carried out. The bread so produced also shows increased volume and softness, and improved grain and texture, as compared to bread made by the identical procedure but with an equal amount of uncoated calcium peroxide.

*Example 3*

The procedure of Example 2 is repeated, except that one half of the weight of corn flour to be introduced to the mulling apparatus is replaced by salt (NaCl) of the type employed by bakers. The salt is somewhat more abrasive than the corn flour, and a corresponding decrease in the tendency for the particles of the mixture to "flow" away from the working surfaces of the mulling apparatus is observed.

*Example 4*

Three hundred parts by weight of a distilled monoglyceride product (Myverol Type 18–30, Distillation Products Industries, Rochester, New York), prepared from edible animal fat and having a minimum monoester content of 90%, an iodine value of about 40, and a congealing point of 58° C., is placed in the bowl of a motorized mixer and brought to fully molten state by heating to about 62° C. Partially dextrinized corn flour, substantially all of the particles of which are 60–80 mesh, is added progressively to the melted monoglyceride, while continually operating the mixer, until the mixture is converted to friable condition, a total of 1,000 parts by weight of the corn flour being employed. The mixture is then cooled to room temperature, with continued agitation to prevent caking.

Working in a heated ribbon blender equipped with trowels in addition to the ribbon elements, the monoglyceride-coated corn flour obtained as above explained is mechanically worked with 56 parts by weight of food grade calcium peroxide (60% $CaO_2$) 80% of which is finer than 325 mesh, and 250 parts by weight of food grade dicalcium phosphate of an average particle size less than 100 mesh, the mixer being operated for 30 minutes after introduction of the materials and the mixture being maintained at about 50° C. to maintain the monoglyceride in softened condition. The particles of the final product have the general configuration seen in Fig. 2, with the particles of calcium peroxide and dicalcium phosphate being variously fully embedded and partially embedded in, and attached to, the monoglyceride coating carried by the corn flour particles.

A complete bread improver composition is prepared by blending the entire quantity of monoglyceride-protected calcium peroxide-dicalcium phosphate product, as produced above, with 4,000 parts by weight full fat enzymatically active soy flour and 4,394 parts by weight of partially dextrinized corn flour. Despite the fact that dicalcium phosphate is even more damaging to the soy flour, during storage, than is calcium peroxide, samples of this bread improver composition stored for 6 months at room temperature and at 98° F. show no undue lipoxidase deactivation, and no rancidity formation.

Baking tests, to produce white bread and using the novel bread improver composition of this example at the rate of .375% of the total weight of wheat flour in the dough, show the expected "calcium peroxide effect" to a greater extent than is attained with the corresponding amount of untreated calcium peroxide. Further, even though the composition has been stored for 6 months, the full effect of the soy flour, as observable, for example, in improved crumb color of the finished bread, is obtained, since the full enzyme activity of the soy flour has been preserved.

*Example 5*

The procedure of Example 4 is repeated, except that an amount of corn syrup equal to 10% by weight of the monoglyceride product is mixed into the melted monoglyceride before the corn flour is added thereto. The mixing action causes the corn syrup to emulsify in the monoglyceride, with the syrup forming the disperse phase of the emulsion. In the finished product, after carrying out the remainder of the procedure in accordance with Example 4, the product is the same as that of Example 4 except that the coating of monoglyceride on the particles of corn flour has tiny globules of corn syrup dispersed therethrough. The presence of the corn syrup in the protective monoglyceride speeds up the removal of the protective material by the liquid phase of the dough during ultimate use of the product in the dough mixing step.

*Example 6*

One hundred parts by weight of the monoglyceride material employed in Example 4 is melted in the bowl of a motorized mixer by heating the same to 62° C. While operating the mixer at slow speed, and maintaining the monoglyceride in fully melted condition, 300 parts by weight of food grade calcium peroxide (60% $CaO_2$, having an average particle size less than 200 mesh) is progressively added. As the calcium peroxide is added, the mixture proceeds first through a stage in which it has the consistency of a heavy syrup, then becomes more sticky and plastic, and is finally converted to a fully friable material at a time prior to the end of the calcium peroxide addition. In other words, during the terminal portion of the mixing operation, the mixture is already friable, so that particles of calcium peroxide completely embedded in the monoglyceride are mechanically worked together with uncoated particles of calcium peroxide, the latter therefore also becoming embedded in and attached to the protective material. The final product accordingly has the general configuration hereinbefore discussed with reference to Fig. 1.

A completed bread improver composition is prepared by blending 400 parts by weight of the monoglyceride-protected calcium peroxide product produced in the above manner with 4,000 parts by weight of full fat enzymatically active soy flour and 5,600 parts by weight of partially dextrinized corn flour, as an extender. Samples of this bread improver composition stored at room temperature and at 98° F. show no formation of rancidity and no undue increase in the lipoxidase activity of the soy flour component over a storage time of 6 months. Hence, the calcium peroxide is obviously suitably protected to prevent damage to the sensitive bread improver constituent of the composition, in this case with enzymatically active soy flour.

On the other hand, test bakes to produce white bread with different bread improver compositions, employing the composition at the rate of .375% of the total flour weight, show not only the expected "calcium peroxide effect," proving that the monoglyceride material is removed from the calcium peroxide during dough mixing, but also an increased improvement over that which is normally obtained by employing the same quantity of uncoated calcium peroxide, indicating that the calcium peroxide is released progressively during the dough mixing stage.

I claim:

1. A bread improver composition comprising a finely divided, solid, inorganic bread improver compound selected from the group consisting of calcium peroxide, the phosphates of calcium and ammonium, the persulfates of calcium, potassium, sodium and ammonium, potassium bromate, potassium iodate, ammonium sulfate, calcium sulfate, ammonium chloride, sodium chlorite and calcium carbonate, at least the major proportion of which is physically combined with a more coarsely particulate, normally solid, edible, water-emulsifiable protective material comprising as its predominant constituent at least one water-emulsifiable material selected from the group consisting of monoglycerides having an iodine value not exceeding 50, mixed mono- and diglycerides having an iodine value not exceeding 50, the tartaric acid esters of mono- and diglycerides having an iodine value not exceeding 50, and normally solid mixtures of such materials with lecithin, the weight of said protective material amounting to from ¼ to 2 times the weight of said inorganic compound, some particles of said inorganic compound being fully embedded in said protective material, other particles of said inorganic compound having at least a portion of their surfaces exposed.

2. A composition in accordance with claim 1 wherein particles of said inorganic compound are fully embedded in, partially embedded in and attached to the particles of said protective material.

3. A bread improver composition characterized by both good storage life and the ability to exhibit delayed action during the mixing of the dough to which it is added, comprising (1) a finely divided, solid, inorganic bread improver compound selected from the group consisting of calcium peroxide, the phosphates of calcium and ammonium, the persulfates of calcium, potassium, sodium and ammonium, potassium bromate, potassium iodate, ammonium sulfate, calcium sulfate, ammonium chloride, sodium chlorite and calcium carbonate, at least the major proportion of which is physically combined with a more coarsely particulate, normally solid, edible, water-emulsifiable protective material comprising as its predominant constituent at least one water-emulsifiable material selected from the group consisting of monoglycerides having an iodine value not exceeding 50, mixed mono- and diglycerides having an iodine value not exceeding 50, the tartaric acid esters of mono- and diglycerides having an iodine value not exceeding 50, and normally solid mixtures of such materials with lecithin, the weight of said protective material amounting to from ¼ to 2 times the weight of said inorganic compound, some particles of said inorganic compound being fully embedded in said protective material, other particles of said inorganic compound having at least a portion of their surfaces exposed, and (2) a particulate enzymatically active material in admixture therewith.

4. A bread improver composition comprising a finely divided, solid, inorganic bread improver compound selected from the group consisting of calcium peroxide, the phosphates of calcium and ammonium, the persulfates of calcium, potassium, sodium and ammonium, potassium bromate, potassium iodate, ammonium sulfate, calcium sulfate, ammonium chloride, sodium chlorite and calcium carbonate, an amount of a normally solid, edible, water-emulsifiable protective material equal to from ¼ to 2 times the weight of said inorganic compound, said protective material comprising as its predominant constituent at least one water-emulsifiable material selected from the group consisting of monoglycerides having an iodine value not exceeding 50, mixed mono- and diglycerides having an iodine value not exceeding 50, the tartaric acid esters of mono- and diglycerides having an iodine value not exceeding 50, and normally solid mixtures of such materials with lecithin, and a more coarsely particulate, solid, edible carrier material, said protective material being present as continuous coatings on at least some of the particles of said carrier material, some particles of said inorganic compound being fully embedded in said coatings and other particles of said inorganic compound being only partially embedded in said coatings, said inorganic bread improver compound having an average particle size not exceeding about 100 mesh and said carrier material having an average particle size of 20–80 mesh.

5. The method for producing a bread improver material capable of exhibiting delayed action during mixing of the dough to which it is added, comprising mechanically working together a finely particulate inorganic bread improver compound selected from the group consisting of calcium peroxide, the phosphates of calcium and ammonium, the persulfates of calcium, potassium, sodium and ammonium, potassium bromate, potassium iodate, ammonium sulfate, calcium sulfate, ammonium chloride, sodium chlorite and calcium carbonate, and a more coarsely particulate, normally solid, edible, water-emulsifiable protective material comprising as its predominant constituent at least one water-emulsifiable material selected from the group consisting of monoglycerides having an iodine value not exceeding 50, mixed mono- and diglycerides having an iodine value not exceeding 50, the tartaric acid esters of mono- and diglycerides having an iodine value not exceeding 50, and normally solid mixtures of such materials with lecithin, the weight of said protective material amounting to from ¼ to 2 times the weight of said inorganic compound, and thereby causing particles of said inorganic compound to be embedded in and partially embedded in the particles of said protective material.

6. A method for producing a bread improver material capable of exhibiting delayed action during mixing of the dough to which it is added comprising first coating an edible, solid, particulate carrier material having an average particulate size of 20–80 mesh with a normally solid, edible, protective material having as its primary constituent at least one water-emulsifiable material selected from the group consisting of monoglycerides having an iodine value not exceeding 50, mixed mono- and diglycerides having an iodine value not exceeding 50, the tartaric acid esters of mono- and diglycerides having an iodine value not exceeding 50, and normally solid mixtures of such materials with lecithin, and then mechanically working said coated carrier material together with a finely particulate, inorganic bread improver compound selected from the group consisting of calcium peroxide, the phosphates of calcium and ammonium, the persulfates of calcium, potassium, sodium and ammonium, potassium bromate, potassium iodate, ammonium sulfate, calcium sulfate, ammonium chloride, sodium chlorite and calcium carbonate, said protective material being employed in an amount equal to from ¼ to 2 times the weight of said inorganic compound, and thereby causing particles of said inorganic compound to be embedded in and partially embedded in the coatings carried by the particles of said carrier material, said inorganic bread improver compound having an average particle size not exceeding about 100 mesh.

References Cited in the file of this patent

UNITED STATES PATENTS

| | | |
|---|---|---|
| 2,067,912 | Frey | Jan. 19, 1937 |
| 2,132,436 | Reynolds | Oct. 11, 1938 |
| 2,185,368 | Bowen | Jan. 2, 1940 |
| 2,288,410 | Lippman | June 30, 1942 |
| 2,321,673 | Hall | June 5, 1943 |
| 2,694,643 | Robinson et al. | Nov. 16, 1954 |
| 2,736,654 | Selman et al. | Feb. 28, 1956 |
| 2,876,160 | Schoch et al. | Mar. 3, 1959 |

OTHER REFERENCES

"Chemicals by Glyco," 1944, Glyco Products Co., Inc. (Brooklyn, N.Y.) p. 33 (Modified Polyhydric Alcohol Esters-Glyceryl Monostearate S).

"Chemicals by Glyco," 1944, Glyco Products Co., Inc. (Brooklyn, N.Y.) p. 35.

Soybean and Soybean Products, 1950, by Markley, Interscience Publishers Inc. (N.Y.), vol. 1, p. 284.

UNITED STATES PATENT OFFICE
CERTIFICATION OF CORRECTION

April 4, 1961

Patent No. 2,978,332

Charles G. Ferrari

It is hereby certified that error appears in the above numbered patent requiring correction and that the said Letters Patent should read as corrected below.

Column 5, line 5, for "the product" read -- a product is obtained --.

Signed and sealed this 29th day of August 1961.

(SEAL)
Attest:

ERNEST W. SWIDER
Attesting Officer

DAVID L. LADD
Commissioner of Patents